United States Patent
Ueno et al.

(10) Patent No.: US 9,595,863 B2
(45) Date of Patent: Mar. 14, 2017

(54) INVERTER CONTROL CIRCUIT AND INVERTER CIRCUIT

(71) Applicant: KABUSHIKI KAISHA TOSHIBA, Minato-ku, Tokyo (JP)

(72) Inventors: Takeshi Ueno, Kawasaki (JP); Tetsuro Itakura, Tokyo (JP); Ikuya Aoyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/170,040

(22) Filed: Jan. 31, 2014

(65) Prior Publication Data

US 2014/0241021 A1    Aug. 28, 2014

(30) Foreign Application Priority Data

Feb. 25, 2013 (JP) ................. 2013-035009

(51) Int. Cl.
| | |
|---|---|
| *H02M 7/537* | (2006.01) |
| *H02M 1/12* | (2006.01) |
| *H02M 7/5387* | (2007.01) |
| *H02M 7/538* | (2007.01) |

(52) U.S. Cl.
CPC ....... *H02M 1/126* (2013.01); *H02M 7/53873* (2013.01); *H02M 7/53803* (2013.01); *Y02B 70/1441* (2013.01)

(58) Field of Classification Search
CPC .. H02M 7/537; H02M 1/126; H02M 7/53873; H02M 7/53803; Y02B 70/1441
USPC ........................... 363/131; 323/271, 282–288
See application file for complete search history.

(56) References Cited

U.S. PATENT DOCUMENTS

| | | | |
|---|---|---|---|
| 5,099,410 A | | 3/1992 | Divan |
| 5,115,386 A | * | 5/1992 | Shirahama ........ H02M 7/53871 307/66 |
| 6,385,067 B2 | * | 5/2002 | Galbiati ............ H02M 7/53873 363/132 |

(Continued)

FOREIGN PATENT DOCUMENTS

| | | |
|---|---|---|
| JP | S64-64564 A | 3/1989 |
| JP | H04-289782 A | 10/1992 |
| JP | 2012-170201 A | 9/2012 |

OTHER PUBLICATIONS

Timothy C. Green et al., "Spectra of Delta-Sigma Modulated Inverters: An Analytical Treatment," IEEE Transactions on Power Electronics, vol. 7, No. 4, pp. 644-654, Oct. 1992.

(Continued)

*Primary Examiner* — Timothy J Dole
*Assistant Examiner* — Htet Z Kyaw
(74) *Attorney, Agent, or Firm* — Knobbe, Martens, Olson & Bear, LLP

(57) ABSTRACT

An inverter control circuit has a quantizer configured to generate a switching signal which changes over switches of a main circuit converting a DC voltage into an AC voltage, and a filter circuit configured to generate a signal having specific transfer characteristic by using a signal correlated with an output voltage of an LC filter which smooths the AC voltage and an instruction signal corresponding to a target value of an output voltage of the main circuit, wherein the quantizer generates the switching signal by quantizing an output signal of the filter circuit.

4 Claims, 7 Drawing Sheets

(56) References Cited

U.S. PATENT DOCUMENTS

| | | | | |
|---|---|---|---|---|
| 6,653,960 B2* | 11/2003 | Mitamura | ............ | H02M 3/157 |
| | | | | 323/282 |
| 7,183,757 B2* | 2/2007 | Nagai | ............ | H02M 3/157 |
| | | | | 323/283 |
| 7,496,336 B2* | 2/2009 | Menkhoff | ............ | G05B 11/42 |
| | | | | 455/230 |
| 7,719,246 B2* | 5/2010 | Melanson | ............ | 323/282 |
| 8,736,245 B1* | 5/2014 | Granat et al. | ............ | 323/285 |
| 2005/0073868 A1* | 4/2005 | Hsieh | ............ | H02M 7/525 |
| | | | | 363/98 |
| 2005/0285584 A1 | 12/2005 | Kwan | | |
| 2009/0243578 A1* | 10/2009 | Wahby | ............ | H02M 3/157 |
| | | | | 323/283 |
| 2013/0241514 A1* | 9/2013 | Molaro et al. | ............ | 323/283 |
| 2013/0335049 A1* | 12/2013 | Schubert | ............ | 323/283 |
| 2014/0117955 A1* | 5/2014 | Zoso | ............ | H02M 3/157 |
| | | | | 323/271 |

OTHER PUBLICATIONS

Richard Schreier, "An Empirical Study of High-Order Single-Bit Delta-Sigma Modulators," IEEE Transactions on Circuits and Systems II: Analog and Digital Signal Processing, vol. 40, No. 8, pp. 461-466, Aug. 1993.

Background Art Information for concise explanations for Cite No. 1 & 2, Toshiba, Jun. 4, 2013.

Office Action issued on Jul. 1, 2016 in corresponding Japanese patent application No. 2013-035009, 6 pgs.

* cited by examiner

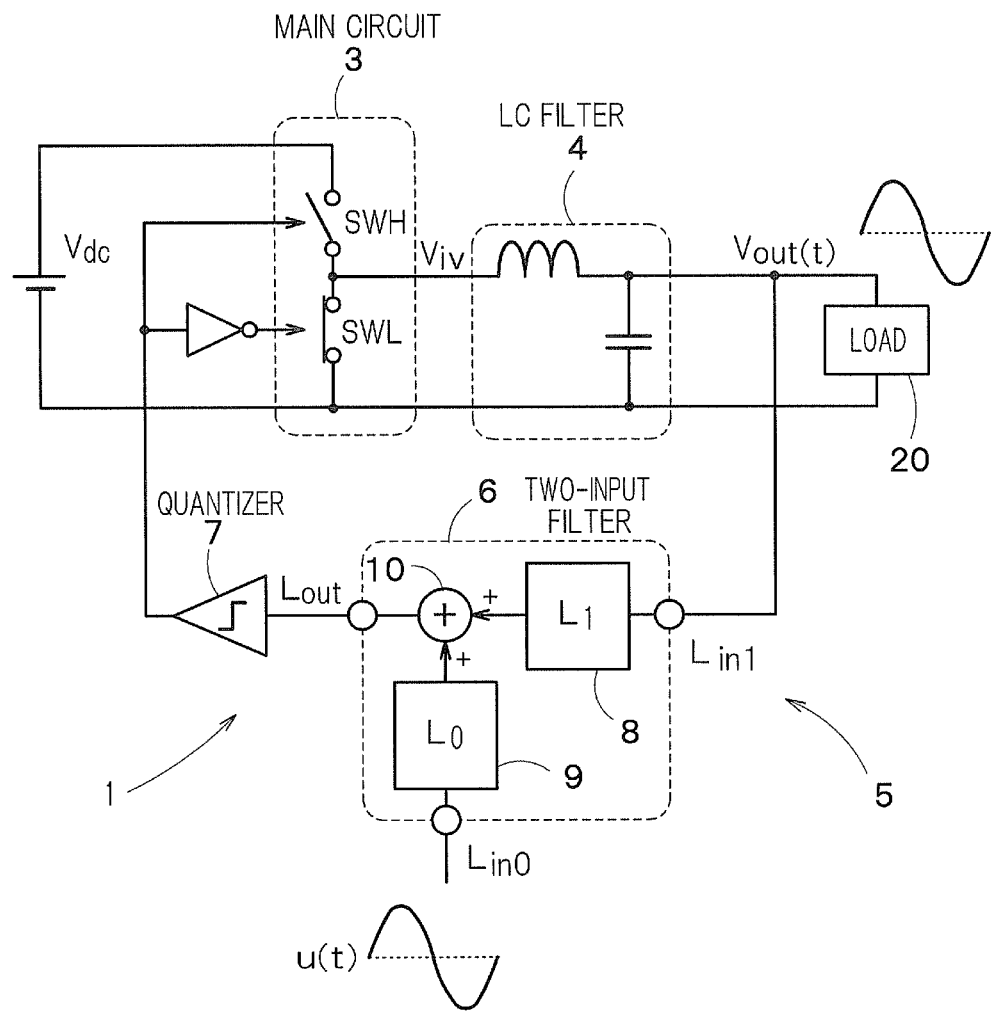
F I G. 1
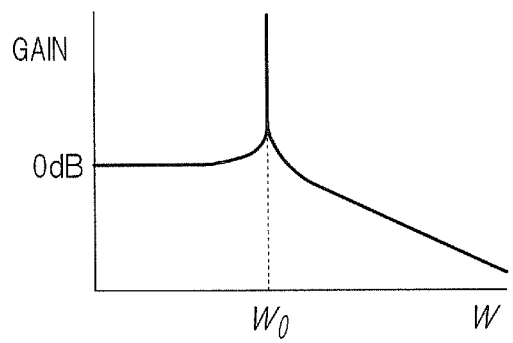
F I G. 2

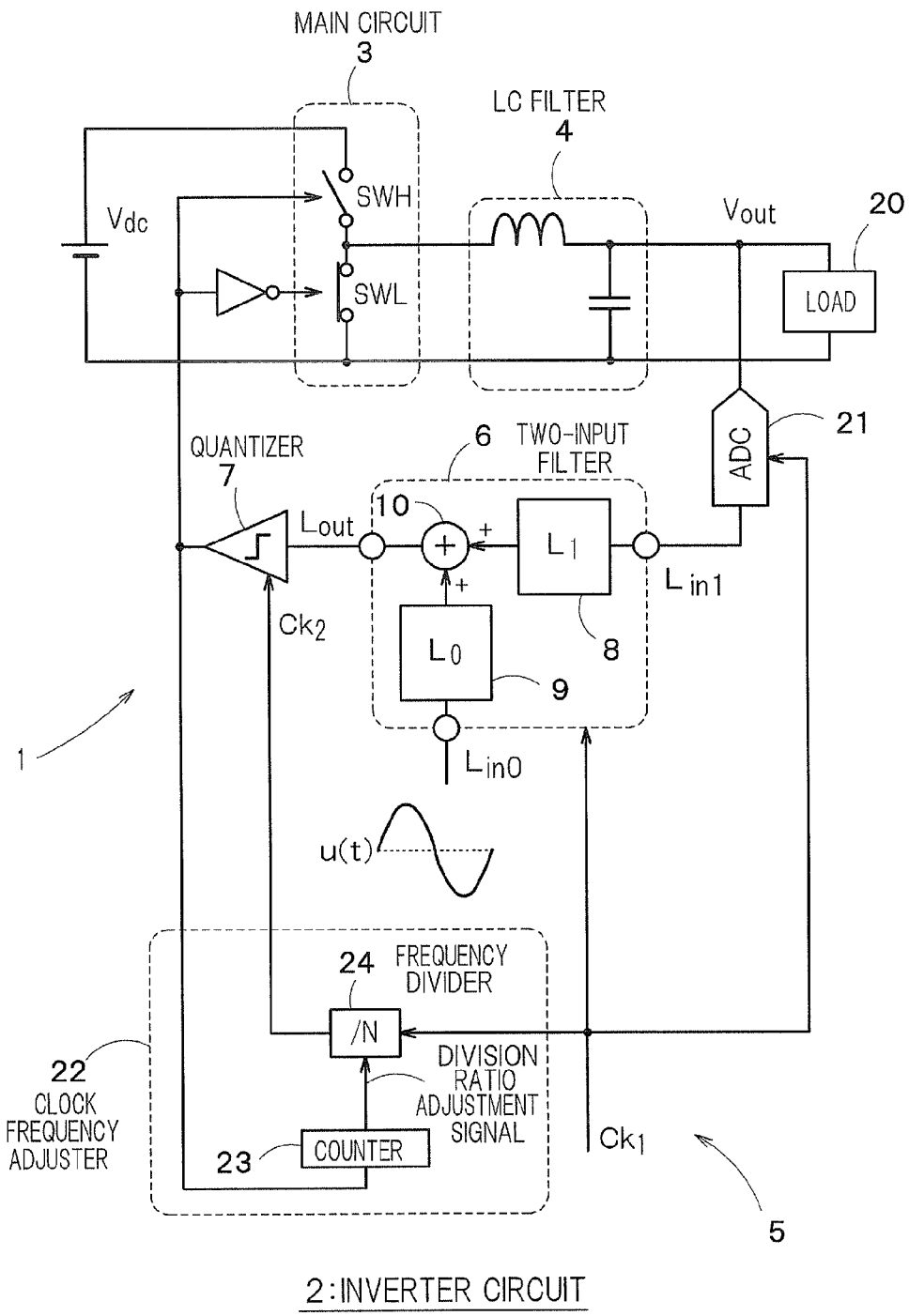
F I G. 7

INVERTER CONTROL CIRCUIT AND INVERTER CIRCUIT

CROSS REFERENCE TO RELATED APPLICATIONS

This application is based upon and claims the benefit of priority from the prior Japanese Patent Application No. 2013-035009, filed on Feb. 25, 2013, the entire contents of which are incorporated herein by reference.

FIELD

Embodiments of the present invention relate to an inverter circuit that converts a DC voltage into an AC voltage and a control circuit that controls the inverter circuit.

BACKGROUND

There is a known technique to convert an instruction value into a 1-bit pulse string using a $\Delta\Sigma$ modulator in order to obtain a signal for controlling switches included in a main circuit of an inverter circuit.

In this technique, an instruction value $u(t)$ is converted into a 1-bit pulse string $v(t)$ by a $\Delta\Sigma$ modulator and the 1-bit pulse string $v(t)$ is used for switching control of the switches included in the main circuit. By this kind of control, an alternate current $i(t)$ can be generated from a DC voltage Vdc. The alternate current $i(t)$ is used for driving a motor M, for example.

When the instruction value has a sine wave, its spectrum becomes a single spectrum. On the other hand, a spectrum of a quantization error (quantization noise) generated at a quantizer becomes a uniformly-distributed continuous spectrum with no specific peak. Therefore, an inverter circuit using a $\Delta\Sigma$ modulator has a feature in that EMI (Electro-Magnetic Interference) rarely occurs.

A voltage-output inverter circuit, such as a power conditioner, smooths a waveform of an AC voltage generated by a main circuit by removing high-frequency components included in the AC voltage, through an LC filter having a reactor (L) and a capacitor (C) provided between the main circuit and a load.

The frequency characteristic of an LC filter has 0 dB in a low frequency range, attenuation characteristic in a high frequency range, and a peak at an LC oscillation frequency wo. Therefore, a wo component of a quantization noise included in an AC voltage output from a main circuit is inevitably amplified. Due to the amplified wo component, the output voltage of the LC filter is superimposed with fluctuations of about 20 kHz that is the LC resonant frequency, in addition to a 50-Hz sine wave, resulting in having a waveform completely different from a sine wave. Especially, the frequency spectrum of this output voltage has a high peak at an LC resonant frequency $f0=wo/2\pi$.

As discussed above, a known inverter circuit using a $\Delta\Sigma$ modulator has a problem in that a sinusoidal voltage cannot be output when an LC filter is connected to a main circuit.

BRIEF DESCRIPTION OF THE DRAWINGS

FIG. 1 is a block diagram of an inverter circuit 2 provided with an inverter control circuit 1 according to a first embodiment;

FIG. 2 is a view showing frequency characteristic of an LC filter 4;

FIG. 7 is a block diagram of an inverter circuit 2 provided with an inverter control circuit 1 according to a fourth embodiment;

DETAILED DESCRIPTION

Figure 3:
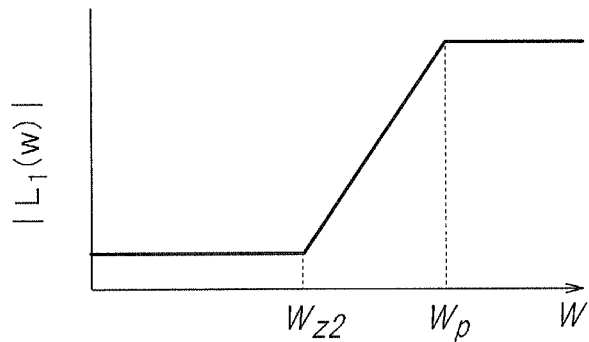
FIG. 3 is a view showing first transfer characteristic of a first filter part 8.

An inverter control circuit according to one embodiment has a quantizer configured to generate a switching signal which changes over switches of a main circuit converting a DC voltage into an AC voltage, and a filter circuit configured to generate a signal having specific transfer characteristic by using a signal correlated with an output voltage of an LC filter which smooths the AC voltage and an instruction signal corresponding to a target value of an output voltage of the main circuit. The quantizer generates the switching signal by quantizing an output signal of the filter circuit.

Embodiments will now be explained with reference to the accompanying drawings.

First Embodiment

FIG. 1 is a block diagram of an inverter circuit 2 provided with an inverter control circuit 1 according to a first embodiment. The inverter circuit 2 of FIG. 1 is provided with a main circuit 3, an LC filter 4, and an inverter control circuit 1.

The main circuit 3 periodically turns on or off a plurality of switches to convert a DC voltage Vdc into an AC voltage Viv. As the plurality of switches, at least two switches are required, although there is no limitation on the actual number. In the following description, an example is explained in which there are provided two switches that are a high side switch SWH and a low side switch SWL. The high side switch SWH and the low side switch SWL are connected in series and applied with a DC voltage Vdc on both terminals thereof. As described later, these switches are turned on or off by switching control with the output signal of the inverter control circuit 1. More specifically, the inverter control circuit 1 turns on either of the switches and turns off the other of the switches.

As described above, by periodically turning on or off the high side switch SWH and the low side switch SWL, the main circuit 3 generates the AC voltage Viv from the DC voltage Vdc.

The AC voltage Viv includes high-frequency component switching noises. Therefore, the LC filter 4 performs a smoothing process to remove the high-frequency component switching noises included in the AC voltage Viv. An AC voltage Vout(t) smoothed by the LC filter 4 is a sinusoidal voltage and used for driving a load 20 that is a motor or the like.

FIG. 2 is a view showing frequency characteristic of the LC filter 4, with the abscissa and ordinate being an angular frequency and a gain [dB], respectively. As shown, the LC filter 4 has a peak gain at a resonant frequency w0. Therefore, the LC filter 4 inevitably amplifies a component of the resonant frequency w0 among quantizing noises included in the AC voltage Viv output from the main circuit 3.

For the reason above, in this embodiment, the LC filter 4 is included in a control loop of a ΔΣ modulator 5 so that resonance does not occur at the resonant frequency of the LC filter 4.

The inverter control circuit 1 of FIG. 1 has a two-input filter 6 and a quantizer 7. The two-input filter 6, the quantizer 7, the main circuit 3, and the LC filter 4 constitute the ΔΣ modulator 5.

An output voltage Vout of the LC filter 4 and an instruction signal u(t) that corresponds to a target value of the output voltage of the main circuit 3 are input to the two input filter 6. The two-input filter 6 has a first filter part 8, a second filter part 9, and an adder 10. The first filter part 8 generates a signal obtained by multiplying a first transfer characteristic by the output voltage Vout of the LC filter 4. The second filter part 9 generates a signal obtained by multiplying second transfer characteristic by the instruction signal u(t). The adder 10 adds the output signal of the first filter part 8 to the output signal of the second filter part 9.

The first filter part 8 is an essential element, however, the second filter part 9 may be omitted. When the second filter part 9 is omitted, the adder 10 adds the output signal of the first filter part 8 to the instruction signal u(t). As described, the two-input filter 6 performs a process of generating a signal of specific transfer characteristic by using the output voltage Vout of the LC filter 4 and the instruction signal u(t).

The quantizer 7 performs binary quantization based on the output signal of the two-input filter 6. With the output signal of the quantizer 7, the high side switch SWH and the low side switch SWL in the main circuit 3 are complimentarily turned on or off. For example, the following control is performed. When the output signal Lout of the two-input filter 6 is 0 or more, the output signal of the quantizer 7 becomes high but when the output signal Lout is less than 0, the output signal of the quantizer 7 becomes low. When the output signal of the quantizer 7 is high, the high side switch SWH is turned on while the low side switch SWL is turned off. However, when the output signal of the quantizer 7 is low, the high side switch SWH is turned off while the low side switch SWL is turned on.

When three or more switches are installed in the main circuit to perform a multi-level inversion operation, the quantizer 7 may be configured so as to output multi-level outputs corresponding to the number of switches.

In this embodiment, the LC filter 4 is included in the control loop of the ΔΣ modulator 5 so that the output voltage Vout of the LC filter 4 accurately follows the instruction signal u. Therefore, resonation at the resonant frequency of the LC filter 4 does not occur.

The LC filter 4 causes a 180-degree phase rotation at its resonant frequency, and hence requires appropriate phase compensation which is performed by the first filter part 8. FIG. 3 is a view showing first transfer characteristic of the first filter part 8, with the abscissa and ordinate being an angular frequency and a gain, respectively. As shown in FIG. 3, the first transfer characteristic has a zero and a pole at angular frequencies wz2 and wp, respectively. It is possible to proceed with a phase within the range of wz2<w<wp having differential characteristic. Therefore, by appropriately setting the angular frequencies wz2 and wp so as to have a unity-gain frequency of the open-loop gain within the range wz2<w<wp, a control loop of the ΔΣ modulator 5 can be stably operated.

The second filter part 9 in the LC filter 4 is located outside the control loop path of the ΔΣ modulator 5 so that it does not affect the stability. Therefore, an appropriate gain may be applied to the second filter part 9 so that the output voltage Vout of the LC filter 4 becomes a desired voltage. Or the gain of the second filter part 9 may be set to 1 if the signal level of the instruction signal u(t) can be adjusted before the signal u(t) is supplied to the two-input filter 6.

As described above, in the first embodiment, the LC filter 4 for smoothing the output voltage of the main circuit 3 is included in the control loop of the ΔΣ modulator 5. Switching control is then performed between the high side switch SWH and the low side switch SWL in the main circuit 3 so that the waveform of the output voltage Vout of the LC filter 4 matches that of the instruction signal u(t). Therefore, the output voltage Vout of the LC filter 4 does not resonate at its resonant frequency, so that the load 20 can be driven with a voltage having the same sine wave as the instruction signal u(t).

Second Embodiment

A second embodiment which will be described below is different from the first embodiment in the internal structure of the two-input filter 6.

Figure 4:
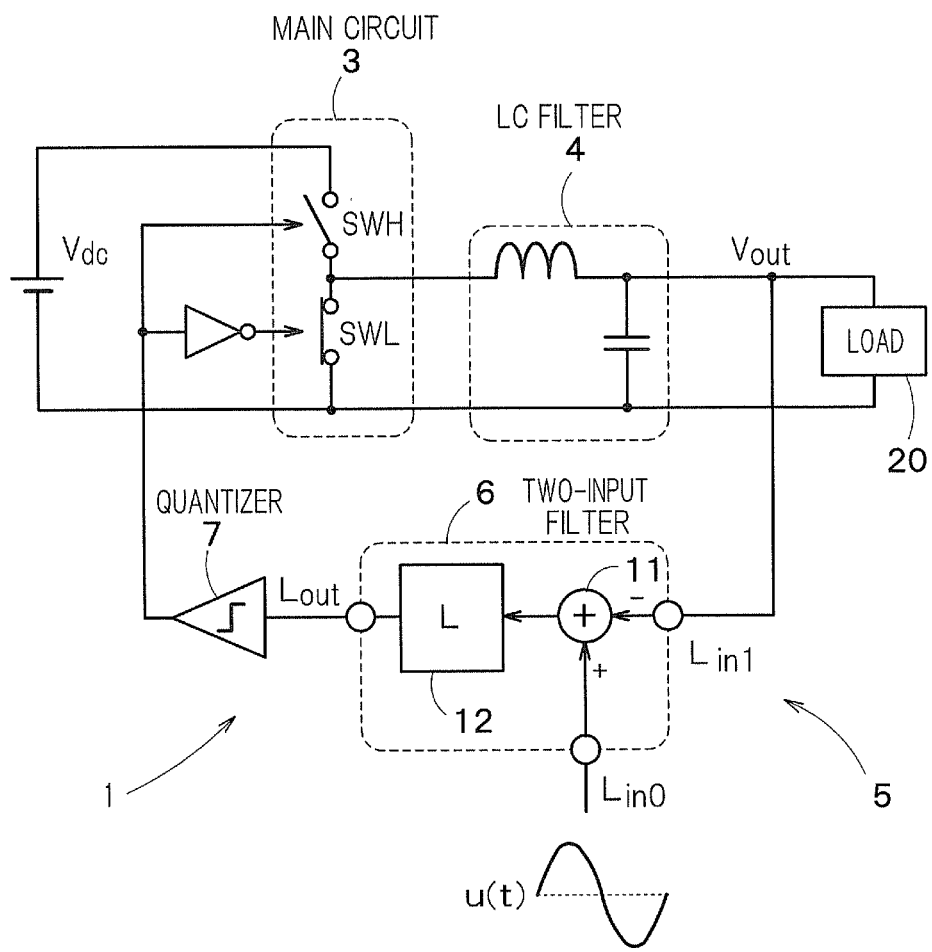
FIG. 4 is a block diagram of an inverter circuit 2 provided with an inverter control circuit 1 according to a second embodiment.

FIG. 4 is a block diagram of an inverter circuit 2 provided with an inverter control circuit 1 according to the second embodiment. The inverter circuit 2 of FIG. 4 is different from FIG. 1 in the internal structure of the two-input filter 6. The two-input filter 6 of FIG. 4 has a subtracter 11 that detects a difference between an output voltage Vout of the LC filter 4 and an instruction signal u(t) and a filter part 12 that generates a signal by varying the output signal of the subtracter 11 according to specific transfer characteristic.

Figure 5:
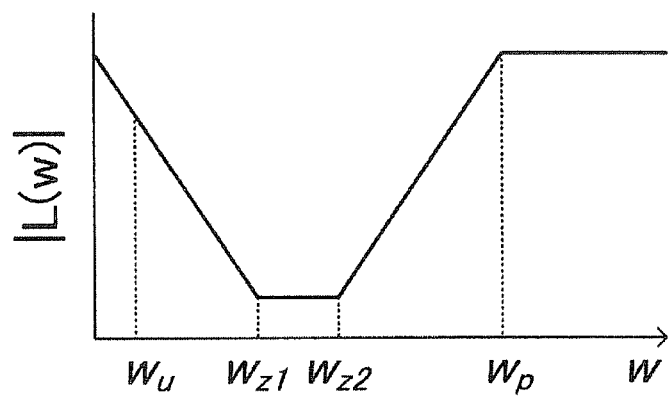
FIG. 5 is a view showing frequency characteristic of a filter part 12.

FIG. 5 is a view showing frequency characteristic of the filter part 12, with the abscissa and ordinate being an angular frequency and a gain, respectively. As shown is FIG. 5, the frequency characteristic has a pole at an angular frequency w=0, added with a zero at an angular frequency wz1, and integral characteristic in a low frequency range. Moreover, the frequency characteristic has differential characteristic within the angular frequency range from wz2 to wp, like FIG. 3.

As described above, by giving the filter part 12 the integral characteristic in a low frequency range, the filter part 12 can have a high gain when an angular frequency wu of the instruction signal u(t) is lower than wz1, thereby reducing the difference between the instruction signal u(t) and the output voltage Vout of the LC filter 4.

When the two-input filter 6 is realized with an analog filter, its transfer function H(s) is expressed by the following equation (1).

$$L(s) = \frac{1}{s} \frac{(s + \omega_{z1})(s + \omega_{z2})}{s + \omega_p} \qquad (1)$$

Figure 6:
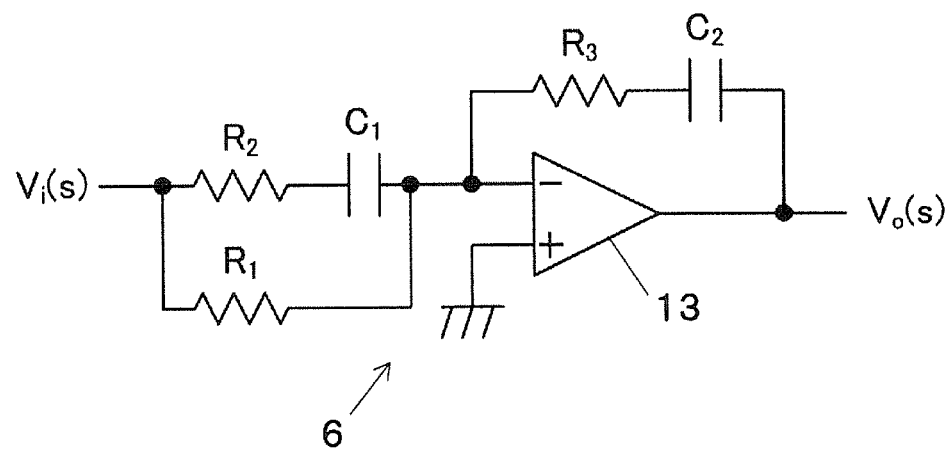
FIG. 6 is a circuit diagram showing an example of a two-input filter 6 configured with an analog filter.

In general, an analog filter expressed by the equation (1) is realized with a circuit such as shown in FIG. 6 using an operational amplifier 13. The circuit of FIG. 6 has a resistor R1 series-connected between an input signal Vi(s) and an inverting input terminal of the operational amplifier 13, a resistor R2 and a capacitor C1 connected to the resistor R1 in parallel, and a resistor R3 and a capacitor C2 series-connected between the inverting input terminal and an output terminal of the operational amplifier 13.

By determining the values of the resistors R1, R2 and R3, and the capacitors C1 and C2 of the circuit of FIG. 6 so as to satisfy the flowing the equations (2) to (4) with the angular frequencies ωz1, ωz2 and ωp of the equation (1), the following equation (5) is established.

$$\omega_{z1} = \frac{1}{R_1 C_1} \quad (2)$$

$$\omega_{z2} = \frac{1}{R_3 C_2} \quad (3)$$

$$\omega_{z3} = \frac{1}{R_2 C_1} \quad (4)$$

$$L(s) = \frac{V_o(s)}{V_i(s)} \quad (5)$$

As described above, in the second embodiment, after a difference signal between the output voltage Vout of the LC filter 4 and the instruction signal u(t) is detected in the two-input filter 6, the difference signal is input to the filter part 12. Therefore, the internal structure of the two-input filter 6 can be simplified compared to the first embodiment. Moreover, by giving the two-input filter 6, not only the differential characteristic but also the integral characteristic, the difference between the output voltage Vout of the LC filter 4 and the instruction signal u(t) becomes smaller. The first filter part 8 and the second filter part 9 in the two-input filter 6 of FIG. 1 may also have the integral characteristic.

Third Embodiment

In the first and second embodiments described above, the output voltage Vout of the LC filter 4 is directly input to the two-input filter 6 which is configured with, for example, an analog filter such as shown in FIG. 6. By contrast, in a third embodiment which will be described below, the output voltage Vout of the LC filter 4 is converted into a digital signal by an A/D converter and then the digital signal is input to a two-input filter 6 that is a digital filter. In this case, the instruction signal u(t) is also required to be digitized so as to be input to the two-input filter 6.

Even when the two-input filter 6 is realized with a digital filter, the operational principle itself of the inverter circuit 2 is the same as that of the first and second embodiments described above. Also in the circuit diagrams of FIGS. 1 and 4, there is no particular modification, except for configuring the two-input filter 6 with a digital filter by adding an A/D converter.

Fourth Embodiment

In a fourth embodiment which will be described below, the two-input filter 6 is realized with a digital filter and the clock frequency of the quantizer 7 is controlled based on the result of measuring the number of times that the main circuit 3 performs switching.

FIG. 7 is a block diagram of an inverter circuit 2 provided with an inverter control circuit 1 according to the fourth embodiment. The inverter control circuit 1 of FIG. 7 has an A/D converter 21 and a clock frequency adjuster 22, in addition to the two-input filter 6 that is a digital filter and the quantizer 7.

The two-input filter 6 is a digital filter, and hence operates in synchronism with an externally-supplied first clock signal CK1.

The clock frequency adjuster 22 divides the first clock signal CK1 to generate a second clock signal CK2. The quantizer 7 operates in synchronism with the second clock signal CK2.

The clock frequency adjuster 22 has a counter 23 and a frequency divider 24. The counter 23 counts the number of times of change in the output logic of the quantizer 7. That is, the counter 23 counts the number of times that the main circuit 3 switches between the high side switch SWH and the low side switch SWL. The frequency divider 24 decides a division ratio N based on the counting result of the counter 23 and divides the first clock signal CK1 at the decided division ratio N to generate the second clock signal CK2.

As described above, the second clock signal CK2 is obtained by dividing the first clock signal CK1. Thus, the frequency of the second clock signal CK2 is equal to or lower than the frequency of the first clock signal CK1.

In the ΔΣ modulator 5, the number of times of change in the output logic of the quantizer 7 within a specific period of time (referred to as an average frequency, hereinafter) varies depending on the structure of a filter (in this case, the two-input filter 6), the number of quantization levels, and the instruction signal u(t), hence very unpredictable.

The average switching frequency of the main circuit 3 within a specific period of time is preferably constant under consideration of conversion efficiency, generation of heat, etc. The average switching frequency of the main circuit 3 is equal to the average frequency of the output signal of the quantizer 7. Therefore, the average switching frequency of the main circuit 3 can be stabilized by controlling the average frequency of the output signal of the quantizer 7.

The frequency divider 24 raises the division ratio N when the average frequency of the output signal of the quantizer 7 is high, so that the frequency of the second clock signal CK2 becomes low and the average switching frequency of the main circuit 3 becomes low. Accordingly, negative feedback is given to the average switching frequency of the main circuit 3 to stabilize the average switching frequency.

The internal structure of the two-input filter 6 that is realized with a digital filter is explained. When the two-input filter 6 of FIG. 7 has the same characteristic as FIG. 5, the characteristic is expressed by the above-described equation (1).

In design of a digital filter, it is general to convert the transfer function of an analog filter by bilinear transform expressed by the following equation (6).

$$s = \frac{1 - z^{-1}}{1 + z^{-1}} \quad (6)$$

When substituting the equation (6) for s in the equation (1), a transfer function L(z) of a digital filter is expressed by the following equation (7).

$$L(z) = \frac{\frac{1 + \omega_{Z1} + \omega_{Z2} + \omega_{Z1}\omega_{Z2}}{1 + \omega_p} + \frac{2\omega_{Z1}\omega_{Z2} - 2}{1 + \omega_p} z^{-1} + \frac{1 - \omega_{Z1} - \omega_{Z2} + \omega_{Z1}\omega_{Z2}}{1 + \omega_p} z^{-2}}{1 - \frac{2}{1 + \omega_p} z^{-1} + \frac{1 - \omega_p}{1 + \omega_p} z^{-2}} \quad (7)$$

The terms of the equation (7) are set to the following equations (8) to (12).

$$a_0 = \frac{1 + \omega_{z1} + \omega_{z2} + \omega_{z1}\omega_{z2}}{1 + \omega_p} \quad (8)$$

$$a_1 = \frac{2\omega_{z1}\omega_{z2} - 2}{1 + \omega_p} \quad (9)$$

$$a_2 = \frac{1 - \omega_{z1} - \omega_{z2} + \omega_{z1}\omega_{z2}}{1 + \omega_p} \quad (10)$$

$$b_1 = -\frac{2}{1 + \omega_p} \quad (11)$$

$$b_2 = \frac{1 - \omega_p}{1 + \omega_p} \quad (12)$$

Figure 8:
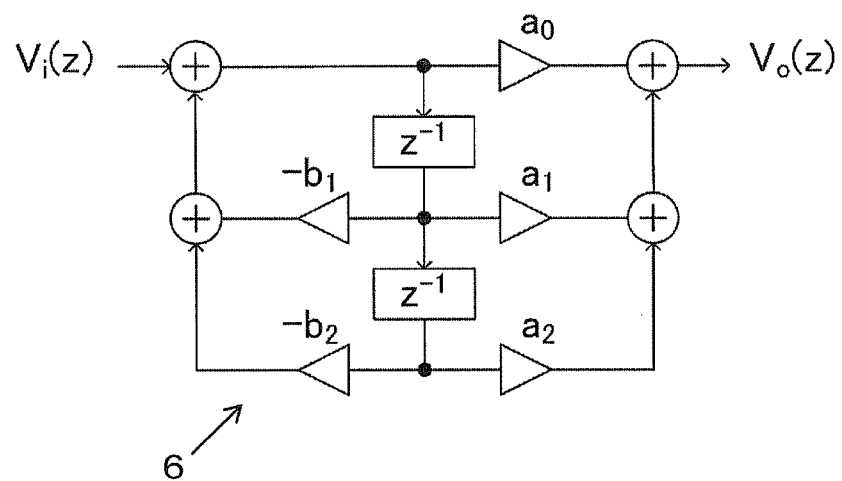
FIG. 8 is a circuit diagram showing an example of a two-input filter 6 configured with a digital filter.

The above-described equations (7) to (12) are represented by a block diagram shown in FIG. 8, which can be implemented with a digital circuit or software.

As described above, in the fourth embodiment, the frequency of the second clock signal CK2 to be supplied to the quantizer 7 is variably controlled based on the average switching frequency of the main circuit 3. Therefore, the average switching frequency of the main circuit 3 can be stabilized.

Fifth Embodiment

In a fifth embodiment which will be described below, the average switching frequency of the main circuit 3 is controlled in accordance with the signal level of the instruction signal u(t).

It is known that the operation of the ΔΣ modulator 5 tends to be unstable when the signal level of the instruction signal u(t) is close to the upper or lower limit of its full scale. Especially, when the clock frequency of the quantizer 7 is low, the quantizer 7 frequently causes delay, resulting in an unstable operation. The fifth embodiment is to solve this problem.

Figure 9:
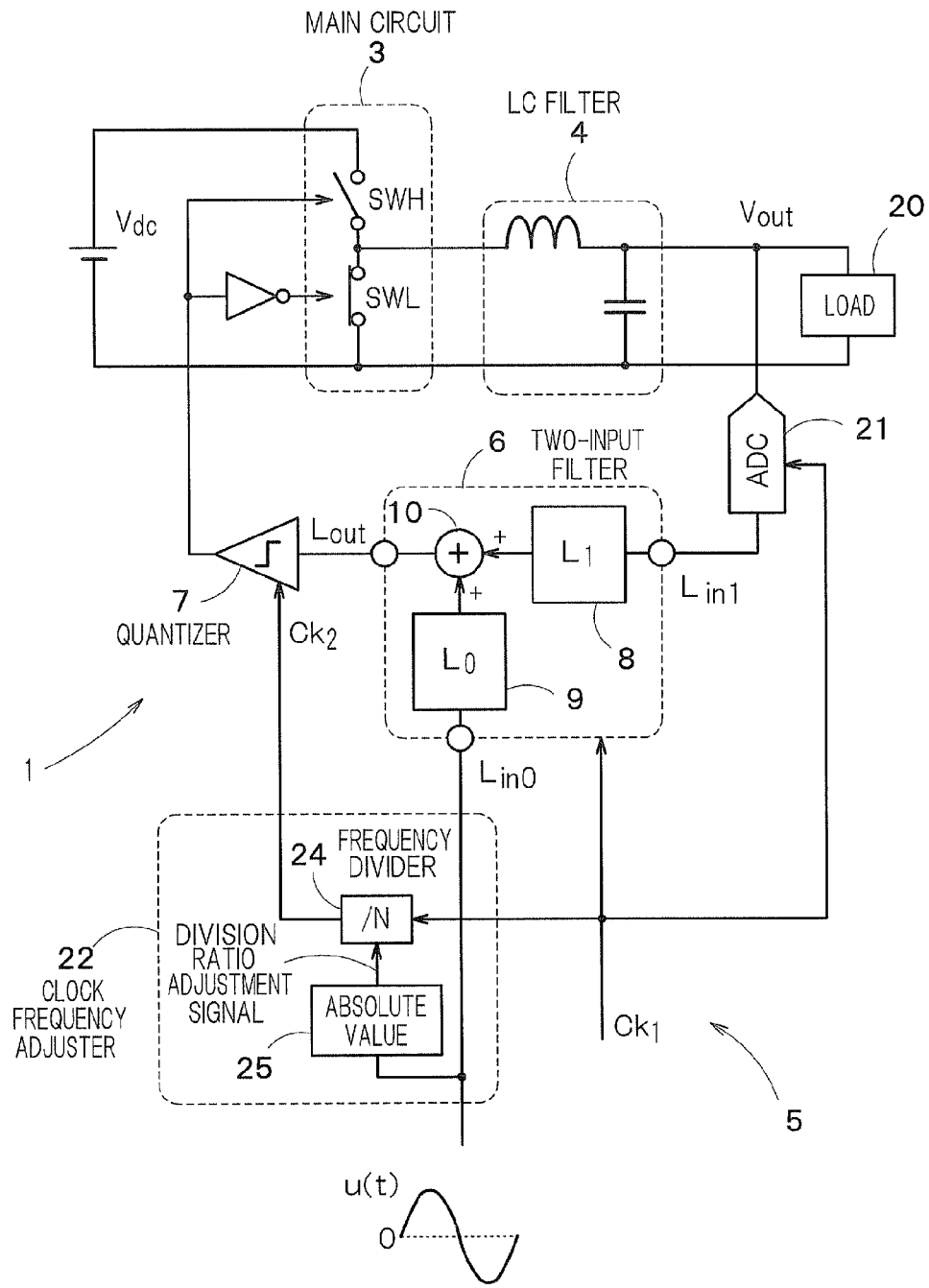
FIG. 9 is a block diagram of an inverter circuit 2 provided with an inverter control circuit 1 according to a fifth embodiment.

FIG. 9 is a block diagram of an inverter circuit 2 provided with an inverter control circuit 1 according to the fifth embodiment. Like FIG. 7, the inverter control circuit 1 of FIG. 9 has a clock frequency adjuster 22 but the operation thereof is different from FIG. 7. The clock frequency adjuster 22 of FIG. 9 has an absolute value detector 25 that detects the absolute value of an instruction signal u(t) and a frequency divider 24 that adjusts a division ratio N based on a detected absolute value.

Figure 10:
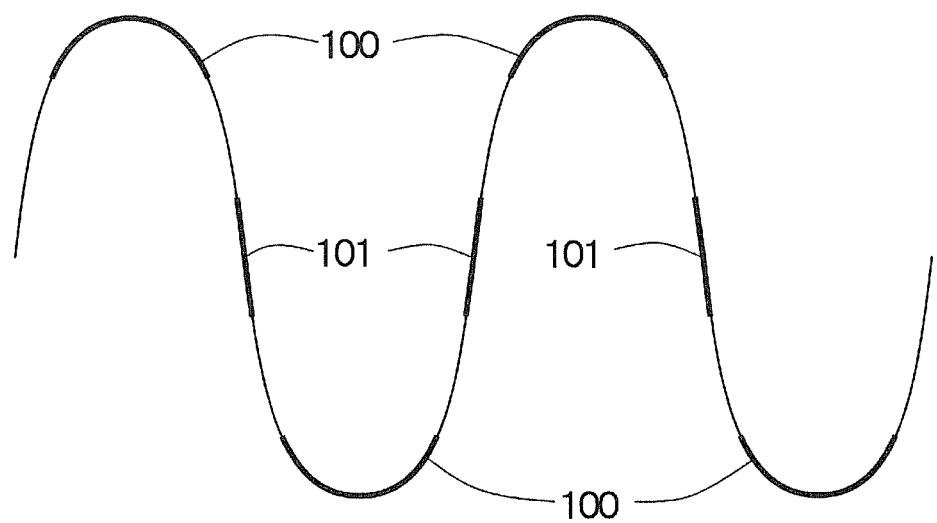
FIG. 10 is a view showing an example of varying a division ratio N with the signal level of an instruction signal.

For example, it is supposed that the instruction signal u(t) is a sinusoidal signal such as shown in FIG. 10. When the absolute value of the instruction signal u(t) is close to the upper or lower limit of its full scale (a thick line area 100 in FIG. 10), the division ratio N is lowered. However, when the absolute value of the instruction signal u(t) is close to zero (a thick line area 101 in FIG. 10), the division ratio N is raised. As the division ratio N is lower, the frequency of the second clock signal CK2 becomes higher. However, as the division ratio N is higher, the frequency of the second clock signal CK2 becomes lower.

With the adjustments described above, when the signal level of the instruction signal u(t) is close to the upper or lower limit of its full scale, the frequency of the second clock signal CK2 becomes higher, so that the switching frequency of the main circuit 3 becomes higher. Therefore, delay in the quantizer 7 is minimized to stabilize the operation of the ΔΣ modulator 5.

The embodiment of the present invention is not limited to the respective embodiments described above but includes a variety of modifications conceivable by parsons skilled in the art. The advantages of the present invention are also not limited to those explained above. Accordingly, various addition, changes, and partial omissions may be made without departing from the scope and spirit of the inventions derived from the accompanying claims and their equivalents.

The invention claimed is:

1. An inverter control circuit comprising:
   a quantizer to generate a switching signal which changes over switches of a main circuit converting a DC voltage into an AC voltage;
   a filter circuit to generate a signal having specific transfer characteristic based on a signal correlated with an output voltage of an LC filter which smoothes the AC voltage and an instruction signal corresponding to a target value of an output voltage of the main circuit so that the signal correlated with the output voltage of the LC filter follows the instruction signal;
   an A/D converter to convert the output voltage of the LC filter into a digital signal,
   wherein the quantizer generates the switching signal by quantizing an output signal of the filter circuit;
   wherein a signal input to the filter circuit, which is correlated with the output voltage of the LC filter, is the digital signal; and
   wherein the A/D converter and the filter circuit operate in synchronism with a first clock signal, and the quantizer operates in synchronism with a second clock signal having a frequency equal to or lower than a frequency of the first clock signal.

2. The circuit of claim 1 further comprising a clock frequency adjuster to adjust the frequency of the second clock signal based on a result of counting the number of times of change in logic of an output signal of the quantizer.

3. The circuit of claim 2, wherein the clock frequency adjuster generates the second clock signal by dividing the first clock signal.

4. The circuit of claim 1 further comprising a clock frequency adjuster to adjust the frequency of the second clock signal based on an amplitude value of the instruction signal.

* * * * *